United States Patent [19]

Takada

[11] 4,222,586
[45] Sep. 16, 1980

[54] PASSIVE VEHICLE OCCUPANT RESTRAINT BELT SYSTEM

[76] Inventor: Juichiro Takada, 3-12-1, Shinmachi Setagayaku, Tokyo, Japan

[21] Appl. No.: 33,568

[22] Filed: Apr. 27, 1979

[30] Foreign Application Priority Data

Jul. 10, 1978 [JP] Japan .................................. 53-93944

[51] Int. Cl.² ............................................. A62B 35/00
[52] U.S. Cl. .................................. 280/803; 280/804; 280/807
[58] Field of Search ............... 280/803, 804, 802, 801, 280/806, 807, 808; 297/485, 469

[56] References Cited

U.S. PATENT DOCUMENTS

| | | | |
|---|---|---|---|
| 4,118,053 | 10/1978 | Neveux | 280/807 |
| 4,124,224 | 11/1978 | Matsuaka | 280/802 |
| 4,168,850 | 9/1979 | Stephenson | 280/803 |

FOREIGN PATENT DOCUMENTS 1040964 9/1966 United Kingdom ..................... 280/808

Primary Examiner—John A. Pekar
Attorney, Agent, or Firm—Brumbaugh, Graves, Donohue & Raymond

[57] ABSTRACT

A shoulder belt leading from a retractor on the vehicle roof and a lap belt leading from a retractor on the door are buckled to each other at a location generally inboard of the seat. A tongue on one of the belts passes through a D-ring fastened to the vehicle on the inboard side of the seat, the D-ring being large enough to allow the tongue to pass readily through it. The belts can be unbuckled from each other and will be wound into the retractors for easy emergency escape of a passenger.

3 Claims, 3 Drawing Figures

PASSIVE VEHICLE OCCUPANT RESTRAINT BELT SYSTEM

FIELD OF THE INVENTION

This invention relates to a passive vehicle occupant restraint belt system which makes provision for easy emergency escape of the occupant should the system malfunction or become disabled.

BACKGROUND OF THE INVENTION

Among the various forms of passive restraint belt systems are those in which both a shoulder belt and a lap belt are transferred between occupant-restraining and occupant-releasing positions in response to closing and/or opening of the vehicle door. In some of those systems, a shoulder belt leads from a retractor mounted on the vehicle roof above and behind the passenger through a transfer guide that moves between a rearward position and a forward position along a path generally above the door and thence downwardly and inwardly across the seat. A lap belt leads from a retractor mounted on the lower rear corner of the door through a guide that moves generally upwardly, and preferably forwardly as well, along the door from a position near the retractor and leads from the guide across to the inboard side of the seat. In some of those systems the lap and shoulder belts are portions of a continuous belt, such portions being delineated at a D-ring on the inboard side of the seat through which the continuous belt passes.

Many passive restraint belt systems provide for emergency release of the belt system in the event of a malfunctioning or disabling of the system. For example, if the door cannot be opened after an accident, it is important that the restraint belt can be disconnected so that the passenger can leave or be taken from the vehicle. In systems of the type described above, it has been proposed that the continuous belt be secured at the inboard side of the seat by means of a buckle. When the buckle is released, however, the continuous belt still remains connected between the retractor on the roof and the retractor on the door. If the vehicle door can be opened, the still attached belt will extend down from the roof to the door and present a hindrance to an occupant who tries to leave the vehicle; he may catch his body or his clothing on the belt and thereby be endangered. Moreover, the tension applied to the belt by the retractors hinders the free opening of the door, even though it is desirable that the escape of the passenger be made as easy as possible in an emergency situation. If the door cannot be opened, it may be necessary for the passenger to escape through the window, in which case the belt still presents a hindrance to the passenger's escape because it extends across the rear part of the window.

SUMMARY OF THE INVENTION

The present invention provides an improvement in the type of passive vehicle passenger restraint system described above, namely a system having a shoulder belt leading from a retractor affixed to the roof above, behind and outboard of the vehicle seat and a lap belt leading from a lap belt retractor affixed to the vehicle door adjacent the lower rear corner, the shoulder belt leading from the shoulder belt retractor to the transfer ring which is movable along the roof above the door and thence across to the inboard side of the seat, and the lap belt leading from the lap belt retractor to and through a transfer ring movable along the door and thence across to the inboard side of the seat. The improvement, according to the present invention, comprises a D-ring located at the inboard side of the seat, a buckle affixed on the inboard end of one of the belts and a tongue affixed on the inboard end of the other belt. The end of the belt with the tongue on it passes through the D-ring, and the tongue is detachably coupled to the buckle. The hole in the D-ring is sufficiently large to allow the tongue to be pulled back through when it is detached from the buckle so that both belts can be retracted by the respective retractors when they are unbuckled from each other. When so retracted, both belts are no longer in the way of the passenger trying to escape from the vehicle in an emergency situation.

In a preferred embodiment of the invention, at least one of the retractors includes a device for sensing when the belts are detached and for setting off an alarm indicative of such a condition. It is also desirable that both retractors be of the emergency locking type and that the lap belt retractor include a device fo inactivating the locking mechanism when the door is opened in response to release of an operating member from a strike on the door frame.

For a better understanding of the invention, reference may be made to the following description of an exemplary embodiment, taken in conjunction with the figures of the accompanying drawings.

DESCRIPTION OF EXEMPLARY EMBODIMENTS

Figure 1:
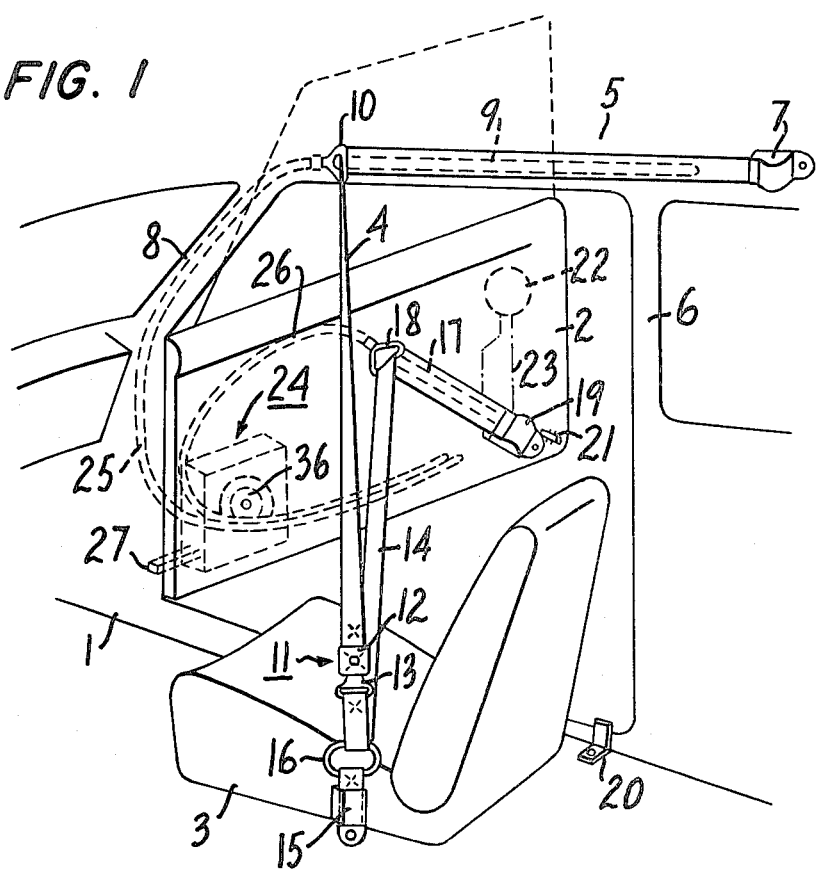
FIG. 1 is a schematic pictorial view of the embodiment showing it in the occupant-releasing position with the door open and with the buckle for connecting the lap and shoulder belts attached.

The embodiment shown in the drawings is a passive vehicle occupant restraint system in which opening and closing motions of the door 2 of the vehicle 1 transfer a restraint belt system associated with the vehicle seat 3 between an occupant-releasing configuration and an occupant-restraining configuration. A shoulder belt 4 leads from an emergency locking retractor 7 affixed to the vehicle roof 5 generally above and behind the center post 6 of the vehicle body to and through a transfer ring 10 received by means of a slider for movement along a guide rail 9 which extends along the roof 5 above the door from a location near the retractor 7 to a location somewhere near or along the front post 8 of the vehicle body. The shoulder belt 4 then crosses the seat to an inboard end which is affixed to a buckle 12 of a coupling designated generally by the reference numeral 11. The other component of the coupling 11 is a tongue 13 which is affixed to the inboard end of a lap belt 14. The lap belt leads from the tongue 13 to and through a D-ring 16 affixed to a support 15 that is anchored to a vehicle on the inboard side of the seat and thence to and through a transfer ring 18. The transfer ring has a slider that is received in a guide rail 17 extending generally diagonally along the door. The lap belt then leads into an emergency locking retractor 19. The guide rail 17 extends from a point close to the retractor 19 along a path generally upwardly and diagonally to a point near the window sill of the door.

Each of the retractors 7 and 19 is of the emergency locking type which normally allows the respective belt to be pulled out freely, thereby permitting the passenger to move with a minimum of restraint from the belt system. In the event of a collision or other emergency causing a relatively high acceleration or deceleration, each retractor locks automatically in respone to either an abrupt pull on the belt or to an actuation of an inertial locking device. Many types of emergency locking retractors are well known in the art.

Preferably, the lap belt retractor 19 is of the type which is activated when the door is closed by the release of an operating pin 21 from a strike 20 on the door frame. Inactivation of the lap belt retractor when the door is opened and the pin 21 released prevents it from unintentionally locking when the door is rapidly opened or closed.

Reference numeral 22 designates a schematic representation of an alarm, preferably an audible alarm which sounds in response to a signal indicative of the unbuckling of the tongue 13 from the buckle 12. As indicated diagrammatically by the reference numeral 23 such signal may be an electrical current conducted to the alarm 22 when a switch is closed by enlargement of the turns of the belt on the reel or by contact by the tongue 13 (see FIG. 3). Alternatively, the alarm circuit can be associated with the mounting 15 for the ring 16.

It is intended that the buckle or other detachable coupling 11 normally remain attached and be used only in an emergency situation. In such an emergency the passenger or someone assisting him in leaving the vehicle merely disconnects the coupling 11, thereby permitting the shoulder belt retractor to pull the shoulder belt in such that the buckle 12 is brought up to the transfer ring 10. Similarly, the lap belt retractor 19 winds in the lap belt 14. In this regard it is important that the D-ring 16 on the inboard side of the seat be sufficiently large to allow the tongue 13 readily to pass through. Similarly, it is desirable, though not necessary, that the transfer ring 18 on the door be sufficiently large to allow the tongue 13 to pass through readily, except that it is necessary if the sensing circuit 23 has a switch which is closed by contact with the tongue 13 (see FIG. 3).

Figure 2:
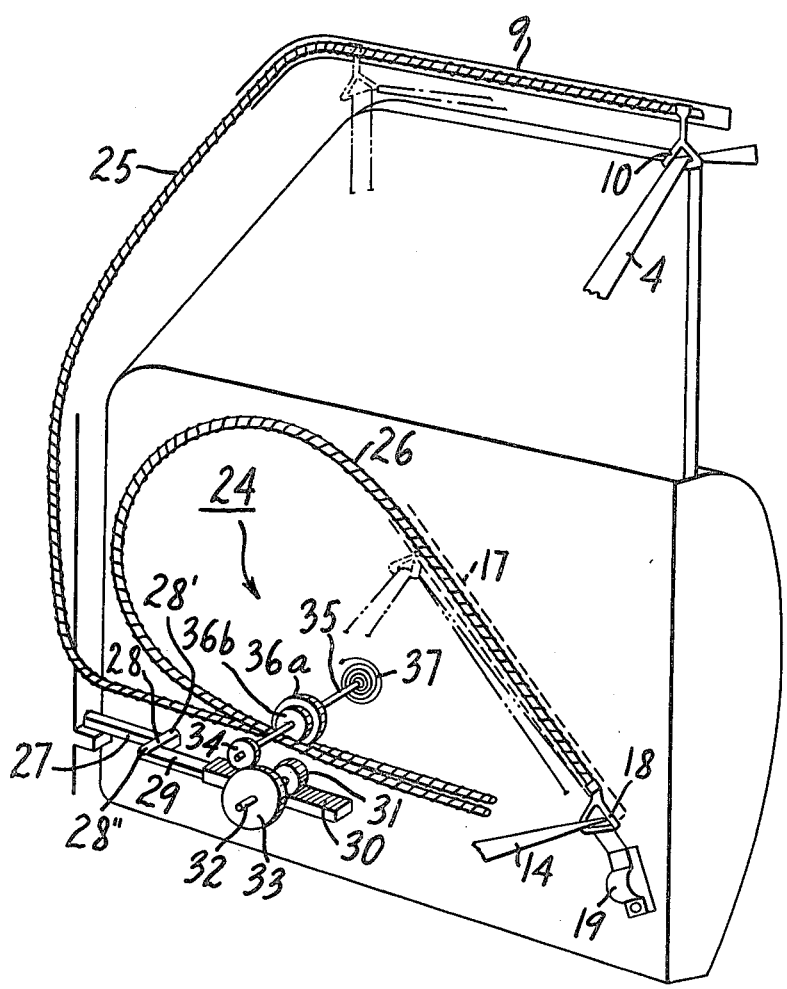
FIG. 2 is a pictorial view in schematic form of a mechanism for transferring the shoulder and lap belts between releasing and restraining positions in response to opening and closing motions of the door.

Referring to FIG. 2, an exemplary mechanism for moving the shoulder and lap belt transfer rings 10 and 18 between the occupant-restraining configuration (the solid lines in FIG. 2) and the occupant-releasing configuration (the dash double dot lines in FIG. 2) comprises a mechanical motion amplifier 24 installed inside the door 2 adjacent the front, hinge edge, a driving member 25 coupled to the transfer ring 10 and a driving member 26 coupled to the transfer ring 18. In the embodiment shown in FIG. 2, each of the driving members 25 and 26 is a racked wire which leads from the amplifier to and into the respective guide rail 9 or 17, preferably through a guide tube (not shown).

The motion amplifier 24 multiplies and transmits the opening and closing motions of the door relative to the vehicle body. The embodiment shown in FIG. 2 employs a folding linkage described and shown in the U.S. patent application of the present inventor Ser. No. 950,020, filed Oct. 10, 1978, and entitled "PASSIVE VEHICLE OCCUPANT RESTRAINT BELT SYSTEM". The folding linkage comprises a first link 27 which is pivotably connected to a bracket on the door post, a second link 29 having a rack gear 30 along one end portion and an intermediate connecting link 28 pivotably connected by pins 28' and 28" to the links 27 and 29. A guide slot or track system (not shown) controls the motion of the linkage such that it remains folded and transmits door motion to an input pinion 31 of the amplifier when the door is moved between closed and partly opened positions and then unfolds, and thereby ceases to transmit door motion, when the door is moved between partly open and fully open.

The amplifier comprises the input pinion 31, a large gear 33 affixed on the same shaft 32 as the input pinion, a second pinion 34 meshing with and driven by the large gear 33 and a double output gear 36 affixed on a shaft 35 common to the pinion 34 and an optional spiral spring 37. The spring 37 stores energy when the door is closed and delivers the energy to assist in driving the transfer guides and associated belt portions when the door is reopened. The double gear consists of a larger gear 36a which meshes with and drives the racked wire 25 associated with the shoulder belt and a smaller gear 36b which meshes with and drives the racked wire 26 associated with the lap belt transfer ring 18. The two different gear sizes of the double gear permits a single motion amplifier to transfer the guides 10 and 18 along different distances. For a more detailed description and illustration of the motion transmitter shown in FIG. 2 (that is, the folding linkage and the motion amplifier), reference may be made to the application referred to above.

The motion transmitter for moving the transfer rings 10 and 18 shown in FIG. 2 is merely exemplary of various drive systems. An alternative type of system is one based on a motion amplifier, a suitable drive coupling between the input of an amplifier and the door frame, and output reels which wind and unwind wires or tapes to which the transfer rings are affixed. Each wire or tape pulls the respective transfer ring forward when the door is opened. A spring connected between the respective transfer ring and some point in the opposite direction from the restraining position restores the transfer ring to the restraining position. In some cases the winding force of the retractor on the belt can be relied upon to return the transfer ring to the desired position. Other alternative systems are those having pulleys, endless wire or tape belts, and electric motors for driving the belts. Racked wires can be driven by gear outputs of electric motors instead of mechanical motion transmitters.

The exemplary embodiment described above and shown in the drawings operates as follows:

(1) When the door is closed, the shoulder belt guide ring 10 resides in the track 9 in a rearward position above and behind the occupant, and the lap belt transfer ring 18 resides in a lower, rearward position adjacent the retractor 19. The shoulder belt 4 extends transversely and downwardly across the passenger to the coupling 11, while the lap belt 14 extends across the lap of the passenger through the ring 16 and to the coupling 11. The emergency locking retractors permit the user to move with the minimum of restraint, but in the event of a collision or other emergency situation, both retractors automatically lock, and the belts restrain the passenger from being thrown forward or upward.

(2) When the door is moved from closed to a partway (say about half-way) open position the linkage between the motion amplifier 24 and the vehicle body remains in folded condition, and the relative movement of the door with respect to the stationary body portion produces rotation of the input pinion 31. Such rotation is multiplied in the gear system and produces rotation of the output double gear 36. Each gear segment of the double gear 36 moves the racked wires 25 and 26 in directions to pull the shoulder belt transfer ring forward to a position near the front post 8 and to pull the lap belt transfer ring 18 diagonally upward along the door to a position near the window ledge, i.e., the positions shown in FIG. 1. In the releasing position shown in FIG. 1 the belts are disengaged from the passenger, and the passenger may get into or out of the vehicle.

(3) When the door is opened from the partly to the fully open position, no additional movement of the racked wires occurs. Instead, the folding linkage unfolds without imparting any substantial relative motion between the gear rack 30 and the input pinion 31.

(4) When the door is reclosed, the operations described above are reversed, thus to restore the restraint belt system to the restraining configuration (solid lines in FIG. 2).

When the belts are moved to the releasing configuration (FIG. 1) they remain coupled together by the coupling 11, and additional lengths of belt are withdrawn from each of the retractors 7 and 19. As soon as the door opens, the strike 20 releases the operating pin 21 of the retractor 19, thereby disabling a retractor 19 from inadvertently locking in response to abrupt movements of the door when it is opened or closed. When the door is reclosed and the belt system is restored to the occupant-restraining position, each of the retractors 7 and 19 pulls in the length of belt and holds the belt in the passenger-restraining position, while permitting each belt section to be pulled from the respective retractor against the rewinding force of the retractor spring. Engagement of the operating pin 21 of the retractor 19 with the strike 20 when the door is fully reclosed reactivates the retractor so that it will lock automatically in the event of an emergency.

As previously mentioned, it is intended that the coupling between the shoulder belt 4 and the lap belt 14 remain attached at all times other than in the event that an emergency escape of the passenger is required if the transfer mechanism malfunctions or becomes jammed or otherwise disabled in a collision. For example, there may be damage to the vehicle in the area of the linkage which will prevent the linkage from operating, or the door may be jammed shut. In those and other emergencies the belt system may actually hinder the passenger from escaping from the vehicle. In that case the passenger or someone assisting him in leaving the vehicle releases the buckle 12 from the tongue 13. The retractor 7 will wind up a length of the shoulder belt sufficient to move the buckle 12 up near the shoulder belt transfer ring 10 (see FIG. 3); similarly, the lap belt retractor 19 will pull the lap belt 14 back through the D-ring 16 and the transfer ring 18 so that the tongue is pulled up to the retractor 19.

Figure 3:
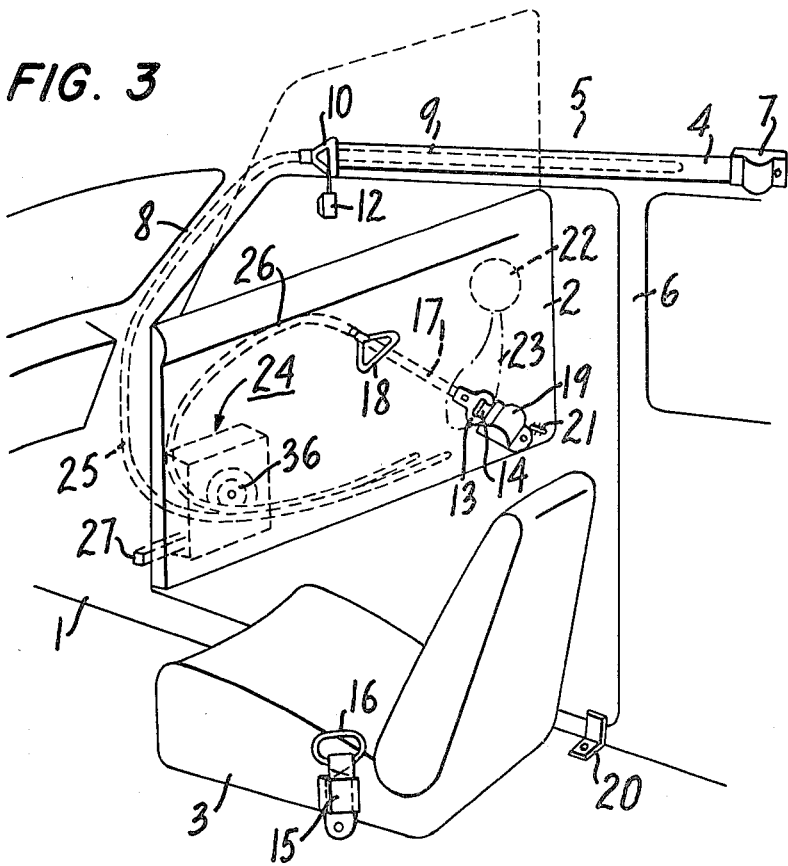
FIG. 3 is a pictorial view in schematic form showing the embodiment in the configuration that exists when the lap and shoulder belts are disconnected from each other in an emergency situation and the door is open.

When the belt system is in the configuration shown in FIG. 3 with excess lengths of belt wound onto the retractors 7 and 19, it is apparent that the passenger may readily leave (or be removed from) the vehicle without hindrance by the lap belt or shoulder belt.

To remind the passenger that the system has been inactivated by disconnecting the coupling 11 and also to discourage passengers from disconnecting the belt and not using it, the alarm 22 signals the uncoupling and deactivation of the belt system in response to the circuit 23, as described above.

The above described embodiments of the invention are intended to be merely exemplary, and numerous variations and modifications, including but not limited to those mentioned above, may be made without departing from the spirit and scope of the invention. All such variations and modifications are intended to be included within the scope of the invention as defined in the appended claims.

I claim:

1. In a passive vehicle occupant restraint belt system having a shoulder belt retractor affixed to the vehicle roof above, behind and outboard of a seat, a lap belt retractor affixed to the vehicle door adjacent the lower rear corner thereof, a shoulder belt leading from the shoulder belt retractor to and through a transfer ring which is movable along a path along the roof generally above the door and thence across to the inboard side of the seat, a lap belt leading from the lap belt retractor to and through a transfer ring movable along the door and thence across to the inboard side of the seat, and a D-ring at the inboard side of the seat, the improvement comprising a buckle affixed on the inboard end of one of the belts and a tongue affixed on the inboard end of the other of the belts, the end of the belt with the tongue passing through the D-ring, the tongue being detachably coupled to the buckle, and the hole in the D-ring being large enough to allow the tongue to be pulled back through when it is detached from the buckle, whereby both belts can be retracted by the respective retractors when they are disconnected so that a passenger can conveniently leave the vehicle in an emergency situation.

2. The improvement according to claim 1 wherein one of the retractors includes means for sensing when the belts are detached and setting off an alarm indicative of such a condition.

3. The improvement according to claim 1 or claim 2 wherein the retractors are emergency locking retractors, and the lap belt retractor includes means for inactivating an emergency locking mechanism thereof when the door is opened in response to release of an operating member from a strike on the door frame.

* * * * *